United States Patent
Coon

[11] 3,913,420
[45] Oct. 21, 1975

[54] METHOD AND MEANS FOR MAKING FILE TEETH

[76] Inventor: James A. Coon, 929 Drever St., West Sacramento, Calif. 95691

[22] Filed: June 12, 1974

[21] Appl. No.: 478,766

[52] U.S. Cl. .......................... 76/13; 29/78; 72/326; 76/101 SM; 76/24
[51] Int. Cl.² ..................... B23D 73/00; B21D 31/02; B21K 21/00; B23D 73/04
[58] Field of Search ............ 72/325, 326, 333, 335; 29/78; 76/13, 24 R, 101 R, 101 A, 101 SM

[56] References Cited
UNITED STATES PATENTS

| | | | |
|---|---|---|---|
| 3,174,363 | 3/1965 | Staiger et al. | 76/24 R |
| 3,290,917 | 12/1966 | Don | 72/333 |
| 3,509,611 | 5/1970 | Kifer | 76/101 SM |
| 3,545,308 | 12/1970 | Stutzke | 76/24 R |

Primary Examiner—Harrison L. Hinson
Attorney, Agent, or Firm—Blair & Brown

[57] ABSTRACT

A method and apparatus for making file teeth including a punch and anvil that forms part of a die set. A strip of metal is positioned on the die set so that by moving the punch into engagement with the strip of metal, a plurality of file teeth will be formed from the strip of metal.

4 Claims, 8 Drawing Figures

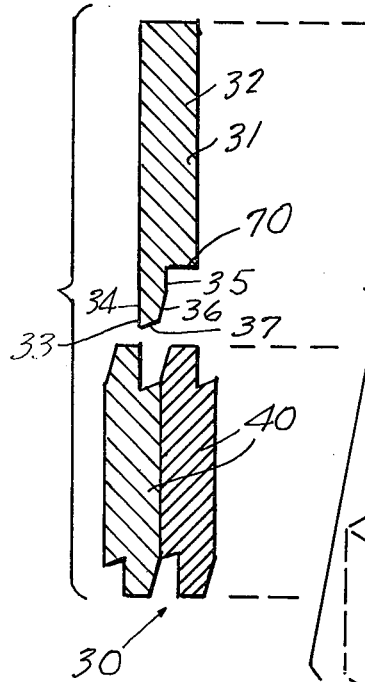
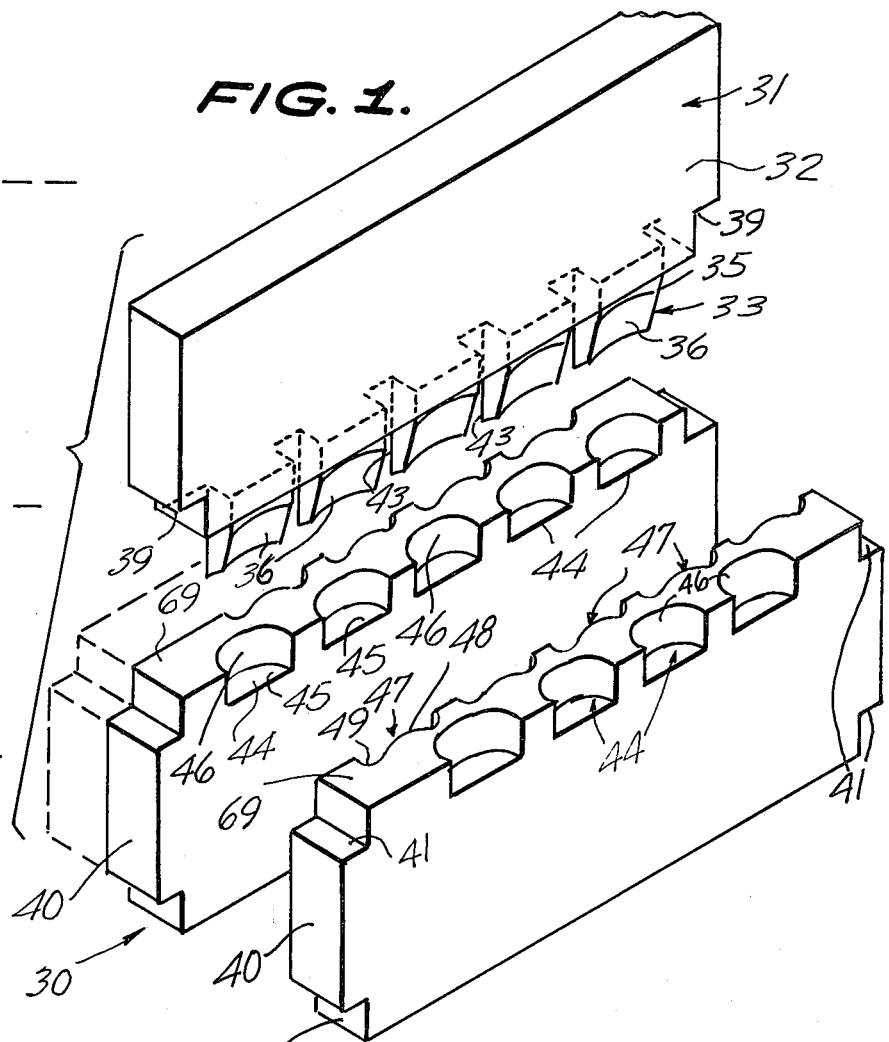
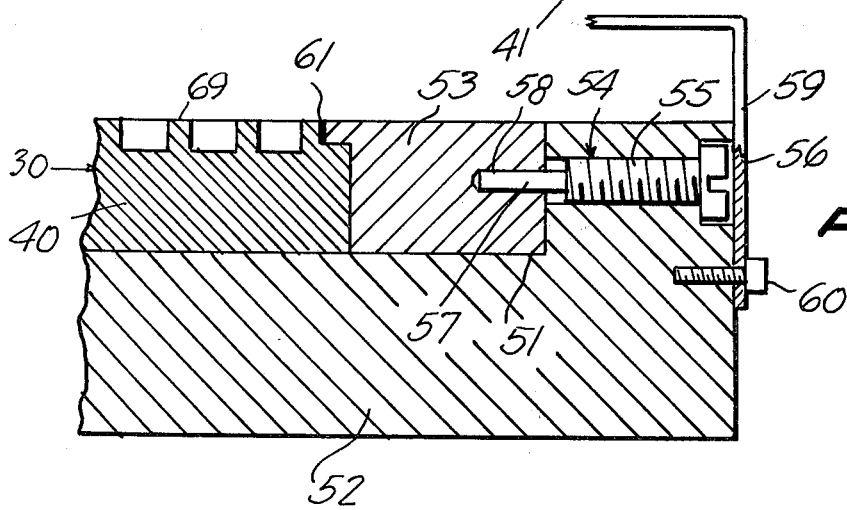
FIG. 1.
FIG. 2.
FIG. 3.

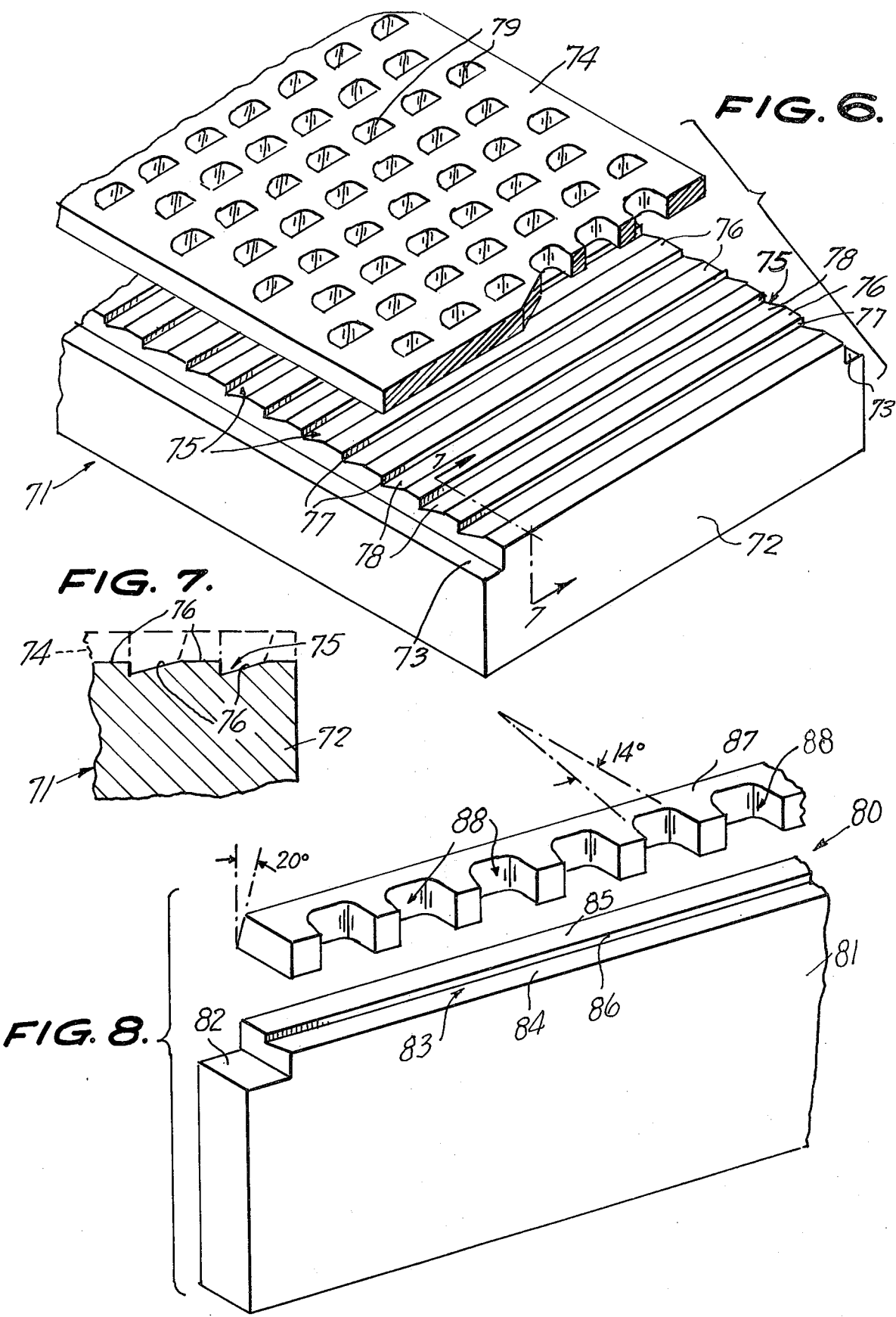

METHOD AND MEANS FOR MAKING FILE TEETH

BACKGROUND OF THE INVENTION

FIELD OF THE INVENTION

The present invention relates to files and file teeth thereon, and more particularly to a method and apparatus for making file teeth.

SUMMARY OF THE INVENTION

A method and apparatus is provided for making file teeth wherein there is provided a die set that includes an anvil and a punch. The punch includes elements that mate with recesses in the anvil so that by moving the punch into engagement with a strip of metal, a plurality of file teeth are struck out from the strip of metal to provide file teeth having the desired angularity, sharpness and other desired characteristics.

The primary object of the present invention is to provide a method and means for efficiently making file teeth in a strip of metal.

Other objects and advantages will become apparent in the following specification when considered in light of the attached drawings.

BRIEF DESCRIPTION OF THE DRAWINGS

FIG. 1 is a perspective view illustrating a die set consisting of anvil members and a punch;

FIG. 2 is a vertical sectional view taken through the die set of FIG. 1;

FIG. 3 is a sectional view illustrating the method of mounting the die set in a base or support;

FIG. 6 is a perspective view of a modified die set, with parts broken away and in section for clarity of illustration;

FIG. 7 is a sectional view taken on the line 7—7 of FIG. 6; and

FIG. 8 is a perspective view of a portion of further modified die set.

DESCRIPTION OF THE PREFERRED EMBODIMENT

Figure 4:
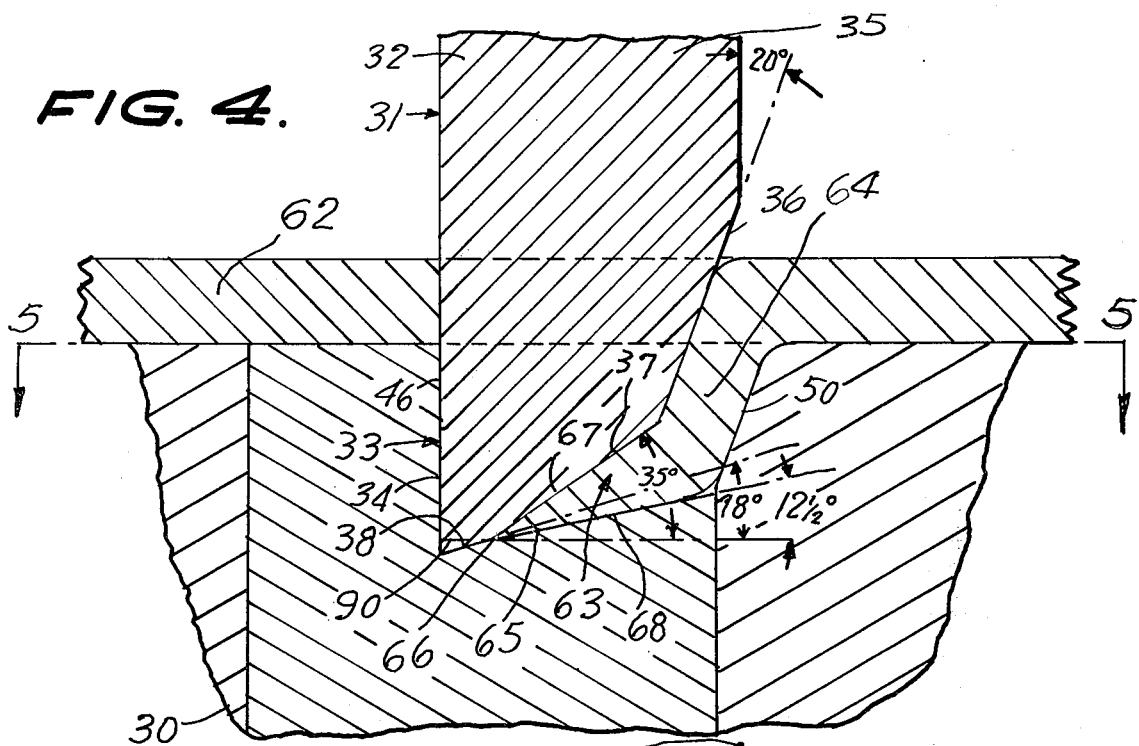
FIG. 4 is an enlarged sectional view illustrating the step of bringing the punch down into the recessed portion of the anvil die set to form teeth in the strip of metal for making the teeth of a file.

Referring now to the drawings in detail, wherein like reference characters indicate like parts throughout the several figures, the reference numeral 30 indicates generally a die set apparatus for making file teeth. The die set apparatus 30 includes a punch 31 that is actuated by a suitable apparatus (not shown). The punch 31 includes a generally rectangular bar 32 that has a plurality of depending spaced apart elements 33 formed integral therewith. Each of the elements 33 has the same construction and each includes a first surface 34 as well as a second surface 35 that is spaced from and generally parallel with the first surface 34. Spaces 43 are provided between the elements 33. Each of the elements 33 further include a third surface 36 that is arranged angularly with respect to the second surface 35 sloping toward the surface 34. A fourth surface 37 is arranged angularly with respect to the third surface sloping toward the surface 34. A fifth surface 38 is arranged angularly with respect to the fourth surface 37, FIG. 4, sloping toward and connecting with the surface 34. End portions of the bar 32 are notched as at 39, FIG. 1.

The die set 30 further includes a plurality of generally rectangular anvil members 40 that have end portions notched as at 41, FIG. 1. The anvils 40 are provided with a plurality of mating recesses 44 and 47 on opposite sides thereof as shown in FIG. 1. Each recess 44 includes or is defined by an inclined surface 45 as well as a curved surface 46. The recesses 47 include an intermediate portion 48 as well as deeper surfaces 49 and an inclined surface 50, FIG. 4.

As shown in FIG. 3 the anvils 40 are supported in a holder 52 that is recessed as at 51. A retainer 53 is provided with a lip 61 for engaging the notched portions of the anvils 40, and a screw member 54 is provided to maintain the parts in their proper assembled position. The screw member 54 includes a threaded section 55 as well as an enlarged head 56 on one end thereof. The screw member 54 also includes a reduced diameter smooth end portion 57 for engaging a hole 58 in the member 53. A bracket 59 that is fastened to the base 52 by securing elements 60.

In FIG. 4 there is illustrated the step of moving the punch 31 down into engagement with the strip of metal 62 so as to form the file teeth 63 in the metal 62. The file teeth 63 are each provided with a struck out portion 64 as well as a tapered portion 65 that terminates in a tip 66. The tapered portion 65 has an upper surface 67 and a lower surface 68.

Figure 5:
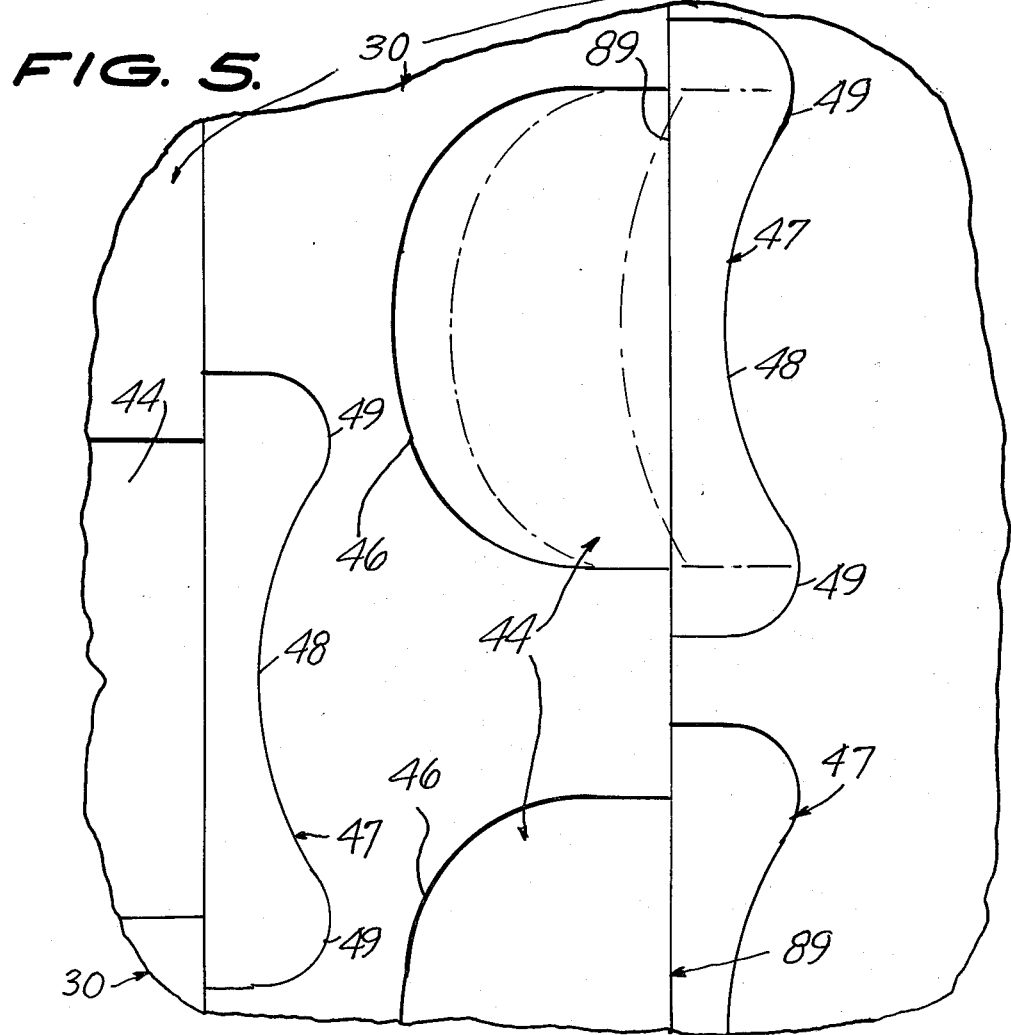
FIG. 5 is a top plan view of the anvil taken generally on the line 5—5 of FIG. 4.

FIG. 5 illustrates the mating recesses 44 and 47 in the anvil segments 40 that with the punch 31 forms the file teeth 63 when the punch 31 is moved into engagement with the strip 62 and the anvil 40. The upper surfaces 60 of the anvils 40 are flat and lower portions 70 of the punch 31 are also flat.

Referring now to FIGS. 6 and 7 the reference numeral 71 indicates generally a modified anvil for making file teeth. The anvil 71 includes a block 72 having notches 73 on opposite sides thereof. A plate 74 coacts with the block 72 to form the complete anvil 71. A multiple punch such as 31 can be selectively moved down into engagement with the anvil 71 with the elements 33 passing through the recesses 79 in the block 74 to form a plurality of rows of teeth in a strip of metal being worked on.

The block 72 includes a plurality of spaced parallel elongate recessed surfaces 75 partially defined by flat surfaces 76 having straight surfaces 77 contiguous thereto, FIG. 6, and inclined surfaces 78 arranged adjacent the surfaces 76 and 77. Recesses 79 coact with the recessed surfaces 75 to form the multiple anvil 71.

Referring now to FIG. 8 the reference numeral 80 indicates generally another modified anvil constructed in accordance with the invention. The block 81 of the anvil 80 is notched at 82 on opposite ends. A recessed portion 83 defined by an inclined surface 84 and a straight surface 86 extends across the top of the block 81 with the top including a flat surface 85. A plate 87 coacts with the block 81 to form the anvil 80. The plate 87 has a plurality of recesses 88 formed therein to coact with recessed portion 83 of the block 81 to receive a punch such as 33. The anvil 80 can consist of a plurality of blocks 81 and plates 87 arranged in side by side relation with respect to each other.

In FIGS. 1 through 5 the numerals 89 indicate the completed recesses that are formed or defined by the matching recessed portions 44 and 47 when the anvil bars 40 are brought together in juxtaposition.

From the foregoing, it will be seen that there has been provided a method and means for making file teeth, and in use, with the parts arranged as shown in the drawings, and in particular as shown in FIGS. 1 through 5 of the drawings, when file teeth are to be formed in a strip of metal 62 a plurality of the anvils 40 are arranged in side by side relation with respect to each other, and these anvils 40 are supported in a convenient support such as the support 52. The strip of metal 62 is then positioned on top of the anvils 40. It will be noted that with the plurality of anvils 40 arranged in side by side relation with respect to each other, that the cooperating or coacting recesses 44 and 47 will coact to define the recessed portions 89 that have the desired configuration. Then, by moving the punch 31 into engagement with the apparatus by means of a suitable mechanism (not shown), the elements 33 will punch out the teeth 63 as shown in FIG. 4 since the elements 33 have a configuration that coacts with the recesses 89 whereby the plurality of file teeth 63 will be struck out or formed in the strip of metal 62 in the desired manner. After the file teeth 63 have been formed in the strip 62, the part 31 is withdrawn from the anvils 40, the strip 62 is then removed from the apparatus, and the strip 62 with the file teeth 63 can be suitably tempered so that the file and file teeth will have the desired strength.

Instead of using the die set 30 shown in FIGS. 1 through 5, an anvil 71 such as that shown in FIGS. 6 and 7 can be used. The strip of metal 62 is positioned over the plate 74 and a punch 31 having elements similar to the elements 33 is moved down into engagement with the anvil 71 so that the elements 33 will pass through the recesses 79 to cause file teeth to be struck out of the metal strip 62 due to the coacting recesses 79 and recesses 75.

Further, as shown in FIG. 8 instead of making an anvil out of a single plate and block, a plurality of blocks and plates 81 and 87 can be utilized in side by side relation with respect to each other to form an anvil having a desired size. In FIG. 8 the segments 81 have the recessed portions 83 for coaction with the recesses 88 whereby a punch 31 can have its elements such as the elements 33 moved through the recesses 88 forming teeth in a metal strip 62.

The parts can be made of any suitable material and in different shapes or sizes as desired or required.

It will therefore be seen that in accordance with the present invention there has been provided file teeth and a method for making the same, and the present invention is especially suitable for making file teeth for hollow files. With the present invention the file teeth are punched out, and the teeth are shaped in the desired configuration, coined, and thus sharpened all in one blow of the press. The relationship of the surfaces of the parts as shown in the drawings is quite important. The metal strip 62 used for the file is about 0.020 inches thick and the tooth itself is sharpened to 0.001 or 0.002 inches to provide an acceptable cutting edge. Further, the punching in one operation also gives the proper rake and clearance angle to the tooth. The drawings illustrate teeth that have been punched out as well as the punch and dies used for making the teeth. The present invention is directed to a method and apparatus for making the teeth with a single punch concept. The dies may be in the form of single dies and punches that are placed in a holder and wherein a plurality of them can be packed therein. The teeth can be cut and formed out of a solid piece of material. A plurality of the punches and corresponding dies can be arranged in side by side relation.

For example when making a half round file, a series of punches such as a series of nine punches and dies can be arranged in the first row and the second row can consist of eight punches and dies. The second row can be staggered in relation to the first row. With this method when packed into the holder there will of course be punches for each row of teeth. The die or anvil proper is cut out or formed at the top on both the front and the rear as shown in the drawings. These, when nested together in a holder will permit forming of the teeth in rows, which are spaced close enough together so that normal manipulation of the file will give a smooth surface without missing any spots. Both ends of the dies and punches are the same. In use, the moveable members are adapted to be placed along one side of the rows of dies and punches within a holder and all dies and punches are adapted to be machined to an exact prescribed length. Pressure is applied inwardly against the ends of the dies and punches by a cap screw such as the cap screw 54 which is inserted through the side wall of the holder 52, FIG. 3. A plurality of the bolts or screws 54 can be closely spaced along the side so as to afford maximum pressure against the ends of the dies and punches.

As shown in FIG. 4 the bottom of the punch as indicated by the numeral 33 is shaped so as to leave a small cavity 90 underneath the same and this may be approximately 2-3/1000ths of an inch deep and servies to sharpen or coin the tooth to a cutting edge.

The method and apparatus of the present invention can be used with a suitable file forming machine, and can be used for making various types of files such as that shown in pending patent application Ser. No. 445,954.

Having thus described the preferred embodiment of the invention, it should be understood that numerous structural modifications and adaptations may be resorted to without departing from the spirit of the invention.

What is claimed is:

1. In an apparatus for making file teeth, a die set including a punch embodying a bar having a plurality of spaced apart depending elements, each of said elements including a first surface, a second surface spaced from and substantially parallel to said first surface, an inclined third surface arranged at an angle with respect to said second surface and sloping toward said first surface, a fourth surface arranged at an angle to said third surface and sloping toward said first surface, a fifth surface arranged at an angle with respect to said fourth surface and connecting with said first surface; an anvil including a plurality of contiguous similar segments, each of said segments having first and second matching recessed portions therein, said first recessed portions being defined by an inclined surface and a curved surface, said second recessed surface including an intermediate curved portion and end portions, said punch and anvil adapted to have a strip of material interposed therebetween punched into said recesses to form file teeth.

2. A device as claimed in claim 1 and further including a holder for said die set.

3. An apparatus for making file teeth comprising an anvil block having a plurality of inclined surfaces arranged in rows, said inclined surfaces being defined by a plurality of recesses, an anvil plate positioned contiguous to the anvil block, and said block and said plate having a plurality of recesses therein, said anvil plate adapted to have a strip of metal positioned thereon and a punch for striking teeth in said metal strip.

4. A device as claimed in claim 3 wherein the anvil block and anvil plate are each of one piece construction.

* * * * *